US012678933B2

(12) United States Patent (10) Patent No.: US 12,678,933 B2
Sherwood (45) Date of Patent: Jul. 14, 2026

(54) SLIDE SYSTEM FOR AN ENERGY TRANSFER SYSTEM

(71) Applicant: Caterpillar Inc., Peoria, IL (US)

(72) Inventor: Matthew Sherwood, Christchurch (NZ)

(73) Assignee: Caterpillar Inc., Peoria, IL (US)

( * ) Notice: Subject to any disclaimer, the term of this patent is extended or adjusted under 35 U.S.C. 154(b) by 91 days.

(21) Appl. No.: 18/736,069

(22) Filed: Jun. 6, 2024

(65) Prior Publication Data

US 2025/0375873 A1 Dec. 11, 2025

(51) Int. Cl.
B25J 5/02 (2006.01)
B25J 9/10 (2006.01)
B25J 11/00 (2006.01)

(52) U.S. Cl.
CPC .................. B25J 5/02 (2013.01); B25J 9/104 (2013.01); B25J 11/008 (2013.01)

(58) Field of Classification Search
CPC ............. B25J 5/02; B25J 9/104; B25J 11/008
See application file for complete search history.

(56) References Cited

U.S. PATENT DOCUMENTS

| | | | |
|---|---|---|---|
| 6,816,755 B2 | 11/2004 | Habibi et al. | |
| 7,999,506 B1 | 8/2011 | Hollar et al. | |
| 9,056,555 B1 | 6/2015 | Zhou | |
| 9,493,087 B2 | 11/2016 | Leary | |
| 10,512,996 B2 * | 12/2019 | Haenschke | B25J 9/026 |
| 10,538,172 B2 | 1/2020 | Kauffmann | |

| | | | |
|---|---|---|---|
| 10,780,585 B2 | 9/2020 | Park et al. | |
| 10,850,633 B2 | 12/2020 | Haddad et al. | |
| 11,065,768 B2 | 7/2021 | Patre et al. | |
| 11,077,557 B2 | 8/2021 | Wallack et al. | |
| 11,400,822 B2 | 8/2022 | Krucinski et al. | |
| 11,701,979 B2 | 7/2023 | Husqvarna | |
| 2012/0233062 A1 | 9/2012 | Cornish | |

(Continued)

FOREIGN PATENT DOCUMENTS

| | | | | |
|---|---|---|---|---|
| CN | 107650711 A1 | 2/2018 | | |
| CN | 110562086 A | * 12/2019 | ............ | B25J 11/008 |

(Continued)

OTHER PUBLICATIONS

Ten-High Double Axis Linear Rail sold on amazon.com, first available date May 19, 2018, https://www.amazon.com/TEN-HIGH-treatment-SGB10-4UU-Adjustable-Carriage/dp/B07D5WQH36?th=1 (Year: 2018).*

(Continued)

*Primary Examiner* — Terrell L McKinnon
*Assistant Examiner* — Ding Y Tan
(74) *Attorney, Agent, or Firm* — Harrity & Harrity

(57) ABSTRACT

In some implementations, an energy transfer system includes a housing. The energy transfer system includes a robotic system that includes one or more components for enabling energy transfer. The energy transfer system includes a slide system configured to move the robotic system between an interior of the housing and an external environment. The slide system includes a slider body mounted to a floor of the housing. The slide system includes a mounting base movably connected to the slider body, a base of the robotic system being mounted to the mounting base.

20 Claims, 9 Drawing Sheets

(56) References Cited

U.S. PATENT DOCUMENTS

| | | | |
|---|---|---|---|
| 2015/0231781 A1* | 8/2015 | Ochiishi | B25J 19/0025 |
| | | | 414/749.1 |
| 2020/0009977 A1 | 1/2020 | Park | |
| 2023/0056007 A1 | 2/2023 | Wolter et al. | |
| 2023/0106720 A1* | 4/2023 | Othman | B60L 53/66 |
| | | | 320/109 |
| 2023/0132562 A1 | 5/2023 | Kummeth et al. | |
| 2023/0347769 A1 | 11/2023 | Bailey | |
| 2024/0051416 A1 | 2/2024 | Hetrich | |
| 2024/0351463 A1* | 10/2024 | Beutler | B60L 53/35 |
| 2025/0332934 A1* | 10/2025 | Jiang | H01R 13/631 |

FOREIGN PATENT DOCUMENTS

| | | | | | |
|---|---|---|---|---|---|
| CN | 110797944 | A | | 2/2020 | |
| CN | 210025271 | U | * | 2/2020 | |
| CN | 210391338 | U | | 4/2020 | |
| CN | 111572373 | A | | 8/2020 | |
| CN | 212796553 | U | | 3/2021 | |
| CN | 113103899 | A | | 7/2021 | |
| CN | 113211409 | A | | 8/2021 | |
| CN | 113442777 | A | | 9/2021 | |
| CN | 114436199 | A | | 5/2022 | |
| CN | 115284248 | A | | 11/2022 | |
| CN | 217804384 | U | | 11/2022 | |
| CN | 115610250 | A | | 1/2023 | |
| CN | 116001609 | A | | 4/2023 | |
| CN | 219077050 | U | | 5/2023 | |
| CN | 116331014 | A | * | 6/2023 | B60L 53/16 |
| CN | 111071088 | B | | 8/2023 | |
| CN | 116552282 | A | | 8/2023 | |
| CN | 116811634 | A | | 9/2023 | |
| CN | 117484525 | A | | 2/2024 | |
| CN | 117764007 | A | | 3/2024 | |
| DE | 102009006982 | A1 | | 8/2009 | |
| DE | 102021130602 | A1 | | 5/2023 | |
| DE | 102022121235 | A1 | | 2/2024 | |
| DE | 102023003427 | A1 | | 3/2024 | |
| EP | 0705665 | B1 | * | 1/1999 | B25J 5/02 |
| EP | 3466747 | A1 | | 4/2019 | |
| EP | 3654476 | A2 | | 5/2020 | |
| JP | 2023088409 | A | | 6/2023 | |
| KR | 102099759 | B1 | | 4/2020 | |
| KR | 102207226 | B1 | | 1/2021 | |
| KR | 20220095751 | A | * | 7/2022 | B60L 53/35 |
| KR | 102545759 | B1 | * | 6/2023 | B60W 30/06 |
| KR | 102573464 | B1 | * | 9/2023 | B60L 53/35 |
| KR | 102625603 | B1 | | 1/2024 | |
| WO | 03015220 | A1 | | 2/2003 | |
| WO | WO-2024012688 | A1 | * | 1/2024 | B60L 53/37 |

OTHER PUBLICATIONS

ABB eMine FastCharge online product pages for mining EV fast charging web.archive.org dated at Feb. 28, 2023 and May 18, 2024 (Year: 2023).*

ABB mining EV fast charging pilot youtube video demo, dated: Sep. 21, 2022 https://www.youtube.com/watch?v=vA-Vs6EhGy0 (Year: 2022).*

"Hyundai Motor Group Shows Newly Developed Automatic Chargin Robot for Electric Vehicles", Press Release, Mar. 21, 2023, 9 pages, https://www.hyundai.news/eu/articles/press-releases/newly-developed-automatic-charging-robot-for-electric-vehicles.html.

Hope, Graham, "Hyundai Robot Can Charge Your Electric Vehicle", IOT World Today, Mar. 22, 2023, 9 pages, https://www.iotworldtoday.com/robotics/hyundai-robot-can-charge-your-electric-vehicle.

Written Opinion and International Search Report for Int'l. Patent Appln. No. PCT/US2024/045135, mailed Sep. 9, 2025 (13 pgs).

* cited by examiner

SLIDE SYSTEM FOR AN ENERGY TRANSFER SYSTEM

TECHNICAL FIELD

The present disclosure relates generally to an energy transfer system and, for example, to a slide system for an energy transfer system.

BACKGROUND

Machines (e.g., that utilize a type of energy source other than fossil fuel, such as electricity, hydrogen, methanol, ammonia, or other sources of energy other than a fossil fuel), such as vehicles or other mobile machines, that are at least partially powered by on-board energy storage systems (e.g., batteries, hydrogen fuel cells, chemical storage components, among other examples) can be environmentally-friendly alternatives to machines powered by fossil fuels. However, in many cases, when a machine operates throughout the day, the on-board energy storage system needs to be replenished several times over the course of the day (e.g., at least five (5) times per day) to ensure that the machine has enough power to continuously operate. In some cases, a technician can connect one or more energy replenishing connectors to one or more receptacles of the machine (e.g., that are associated with an on-board energy storage system of the machine) to allow for the on-board energy storage system of the machine to be replenished. However, this manual process is subject to error (e.g., where a connector is not accurately inserted into a receptacle). This can result in a sub-optimal replenishment of the on-board energy storage system for the machine, such as in terms of an increased amount of time needed to replenish the energy for the machine and a decreased available energy level on-board the machine. Sub-optimal replenishment can impact operations of a machine, such as by reducing an amount of time that the machine is available to perform powered operations (e.g., as compared to an amount of time that the machine needs to be replenished with energy) and by reducing an amount of power that is available to perform the powered operations. Sub-optimal replenishment of the on-board energy storage system for the machine can, in some cases, also degrade the on-board energy storage system of the machine, which impacts a performance and/or an operable life of the on-board energy storage system, and of the machine.

In some examples, a machine includes an energy transfer interface that can be physically connected to an energy transfer system to allow an energy transfer from the energy transfer system to an on-board energy storage system of the machine (e.g., to replenish the on-board energy storage system). However, because of the size of the machine, it may be impractical for a human technician to reach the energy transfer interface to be able to engage one or more plugs and/or receptacles to enable the energy transfer operation. Therefore, in some examples, a mechanical system may be used to enable the engagement of the one or more plugs and/or receptacles for the energy transfer operation. However, because of the size of the machine, a complex mechanical system may be used to enable the mechanical system to reach the energy transfer interface on the machine, such as a customized robotic system with an extended reach arm. This increases the complexity and cost of the mechanical system used to enable energy transfer for the machine. Additionally, or alternatively, the machine may need to be positioned close to the mechanical system to enable the mechanical system to reach and/or engage with the energy transfer interface of the machine. Because the machine may be large and/or difficult to precisely maneuver, positioning (e.g., parking) the machine close to the mechanical system for the energy transfer operation increases the risk of the machine inadvertently contacting or hitting the mechanical system, such as via operator error when approaching the mechanical system (e.g., because the machine may approach (e.g., drive up to) the mechanical system to perform an energy transfer operation, where the mechanical system is in a fixed location). This increases the risk of damage to the mechanical system used for the energy transfer operation.

Further, the machine may operate in environments associated with harsh conditions (e.g., extreme temperatures, high wind speeds, a large amount of debris, and/or other harsh conditions), such as a mine site and/or other work sites. As a result, the mechanical system may operate in the harsh conditions, increasing the risk of damage to one or more components of the mechanical system (e.g., due to the components operating in and/or being exposed to the harsh conditions).

China Patent No. 217804384 ("the '384 patent") discloses an automatic charging terminal and an automatic charging platform, including a charging pile body, to which a charging gun is connected. The '384 patent discloses an automatic control system, including a detection device, a position adjustment device and a slide. The '384 patent discloses that the slide is provided with a motion track arranged along the direction of the vehicle body. The '384 patent discloses that the position adjustment device also includes a telescopic mechanism whose telescopic direction is perpendicular to the motion track and a universal mechanical arm arranged on the telescopic mechanism. The '384 patent discloses that the position adjustment device is configured to move the charging gun based on the position information so that the charging gun is docked with the charging port on the vehicle body.

While the '384 patent discloses a position adjustment device to move a charging gun to dock with a charging port on a vehicle, the '384 patent does not disclose any mechanisms or means for ensuring stability of the mechanical arm during movement via the position adjustment device. This may result in the performance of operations performed via the mechanical arm being degraded. Further, the '384 patent does not disclose any mechanisms or means for protecting the system from harsh operating conditions. Additionally, the '384 patent does not disclose any mechanisms or means for handling the management of a large quantity of cables and/or wires that may be needed to support energy transfer.

The energy transfer system and/or the slide system of the present disclosure solves one or more of the problems set forth above and/or other problems in the art.

SUMMARY

An energy transfer system may include a housing; a robotic system that includes one or more components for enabling energy transfer; and a slide system configured to move the robotic system between an interior of the housing and an external environment, wherein the slide system comprises: a slider body mounted to a floor of the housing; and a mounting base movably connected to the slider body, a base of the robotic system being mounted to the mounting base.

A slide system for moving an energy transfer robotic system may include a slider body; a mounting base configured to engage with the energy transfer robotic system, wherein the mounting base is movably configured on the slider body; and one or more cable routing components configured to route one or more cables of the energy transfer robotic system.

A system may include a housing; a robotic system; and a slide system configured to move the robotic system between an interior of the housing and an external environment, wherein the slide system comprises: a slider body mounted in the interior of the housing; and a mounting base movably connected to the slider body, a base of the robotic system being mounted to the mounting base, and the mounting base being movable between the interior of the housing and the external environment.

DETAILED DESCRIPTION

This disclosure relates to an energy transfer system that is configured to enable an energy transfer to a work machine, which is applicable to any work machine that is at least partially powered by a non-fossil-fuel-based energy storage system (e.g., energy other than fossil-fuel-based energy), such as a battery system. The work machine may be any type of machine configured to perform operations associated with an industry such as mining, construction, farming, transportation, or any other industry. Although some examples are described herein in associated with electrical energy transfer, the techniques, implementations, systems, devices, and/or components described herein may be similarly applicable for other types of energy transfer, such as hydrogen transfer, biofuel transfer, and/or gas transfer (e.g., propane, liquefied petroleum gas, compressed natural gas, liquefied natural gas, or other types of gas), among other examples.

Figure 1:
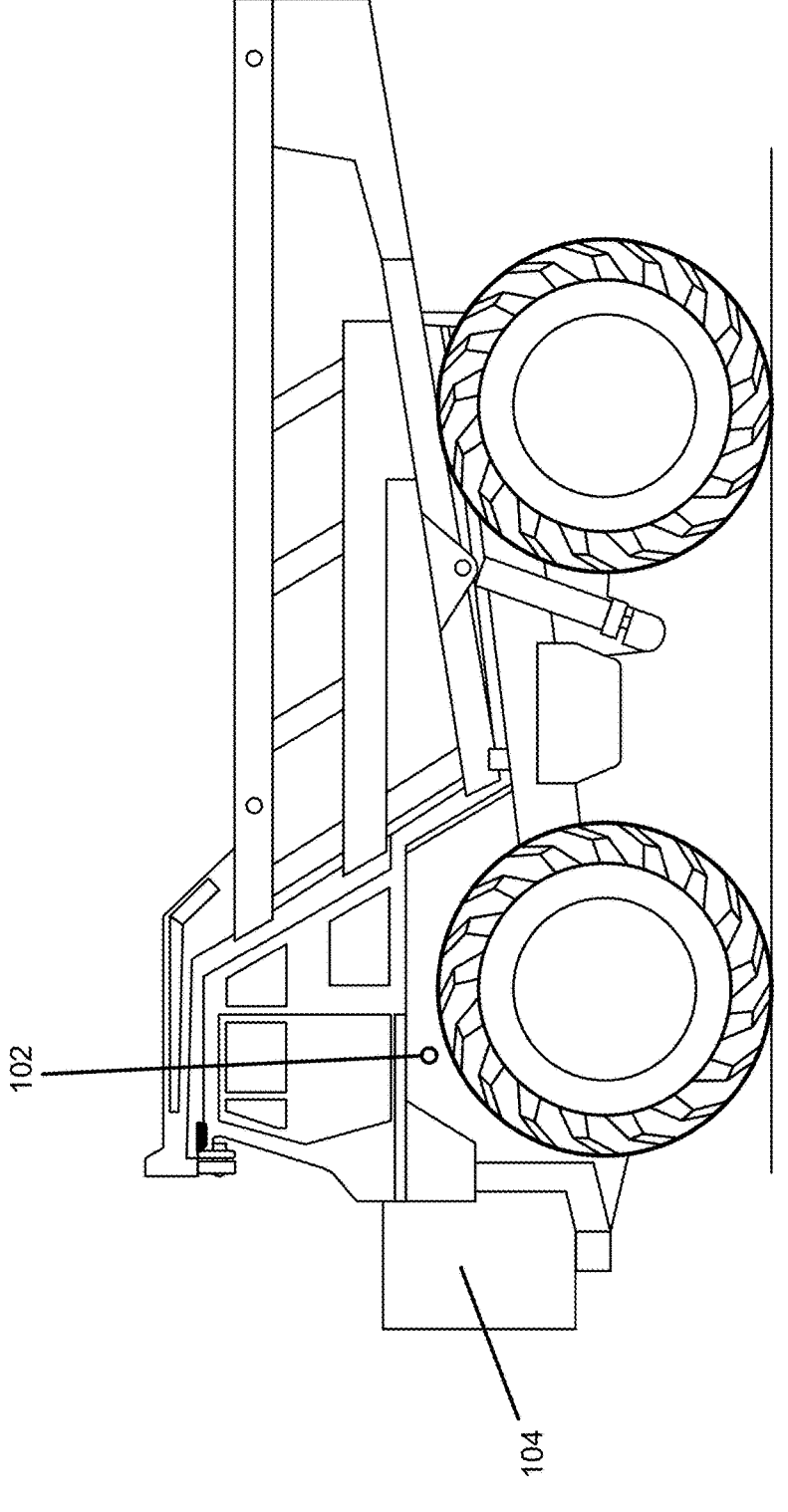
FIG. 1 is a diagram of an example work machine described herein.

FIG. 1 is a diagram (e.g., a side-view) of an example work machine 100 described herein. The work machine 100 may be a mobile machine or vehicle, and may include a dump truck, a wheel loader, a hydraulic excavator, or another type of machine. Further, the work machine 100 may be a manned machine or an unmanned machine. The work machine 100 may be fully-autonomous, semi-autonomous, or remotely operated. As further shown in FIG. 1, the work machine 100 may include an energy storage system 102 (e.g., included within a chassis of the work machine 100) and a receptacle access point 104.

The work machine 100 may be configured to be at least partially powered by the energy storage system 102. That is, the work machine 100 may be a machine that utilizes electricity, hydrogen, methanol, ammonia, and/or other sources of energy other than a fossil fuel. As an example, the energy storage system 102 may include one or more batteries that store energy to be used to power one or more components of the work machine 100. For example, the work machine 100 may be a battery electric machine (BEM), a battery electric vehicle (BEV), a hybrid vehicle, a fuel cell and battery hybrid vehicle, or another machine that is at least partially powered by the energy storage system 102. The work machine 100 may include one or more electric engines, one or more electric motors, one or more electrical conversion systems, and/or other electrical components that are configured to convert and/or use energy, such as energy stored in the energy storage system 102, to cause overall movement of the work machine 100 across a work site and/or to cause movement of individual components or systems of the work machine 100.

The receptacle access point 104 provides an energy transfer interface (e.g., a wired energy transfer interface) for the energy storage system 102 and/or another fuel or energy storage of the work machine 100. For example, the receptacle access point 104 provides an energy transfer interface that can be physically connected to an energy transfer system (e.g., the energy transfer system 200 described herein) to allow an energy transfer from the energy transfer system to the energy storage system 102 (or vice versa) or other fuel or energy storage. The receptacle access point 104 may be located on a front of the work machine 100 (as shown), a side of the work machine 100, a back of the work machine 100, a bottom of the work machine 100, a top of the work machine 100, or at any other position on the work machine 100. The receptacle access point 104 is further described herein.

As indicated above, FIG. 1 is provided as an example. Other examples may differ from what is described in connection with FIG. 1.

Figure 2A:
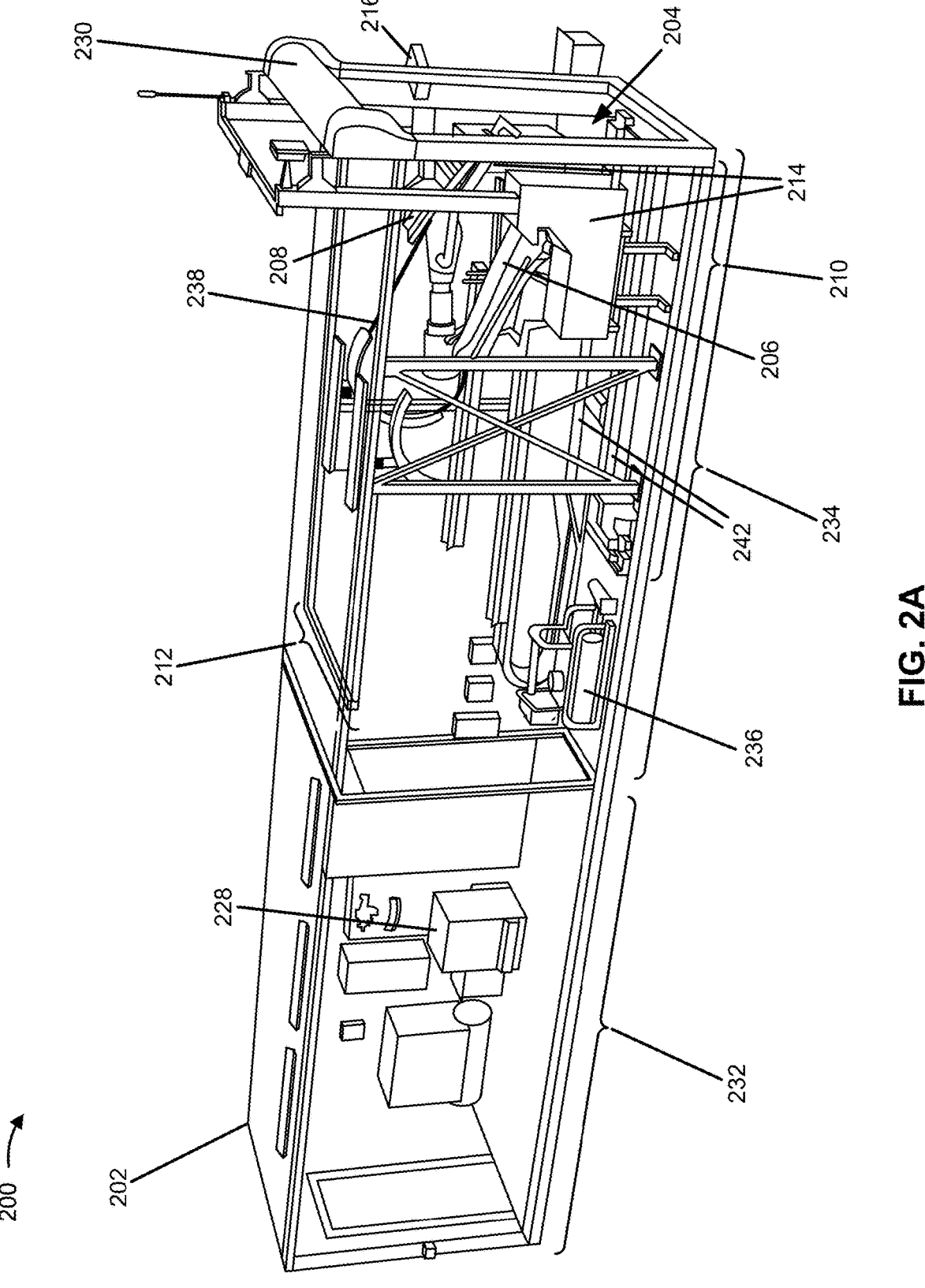
FIGS. 2A-2B are diagrams of an example energy transfer system described herein.
Figure 2B:
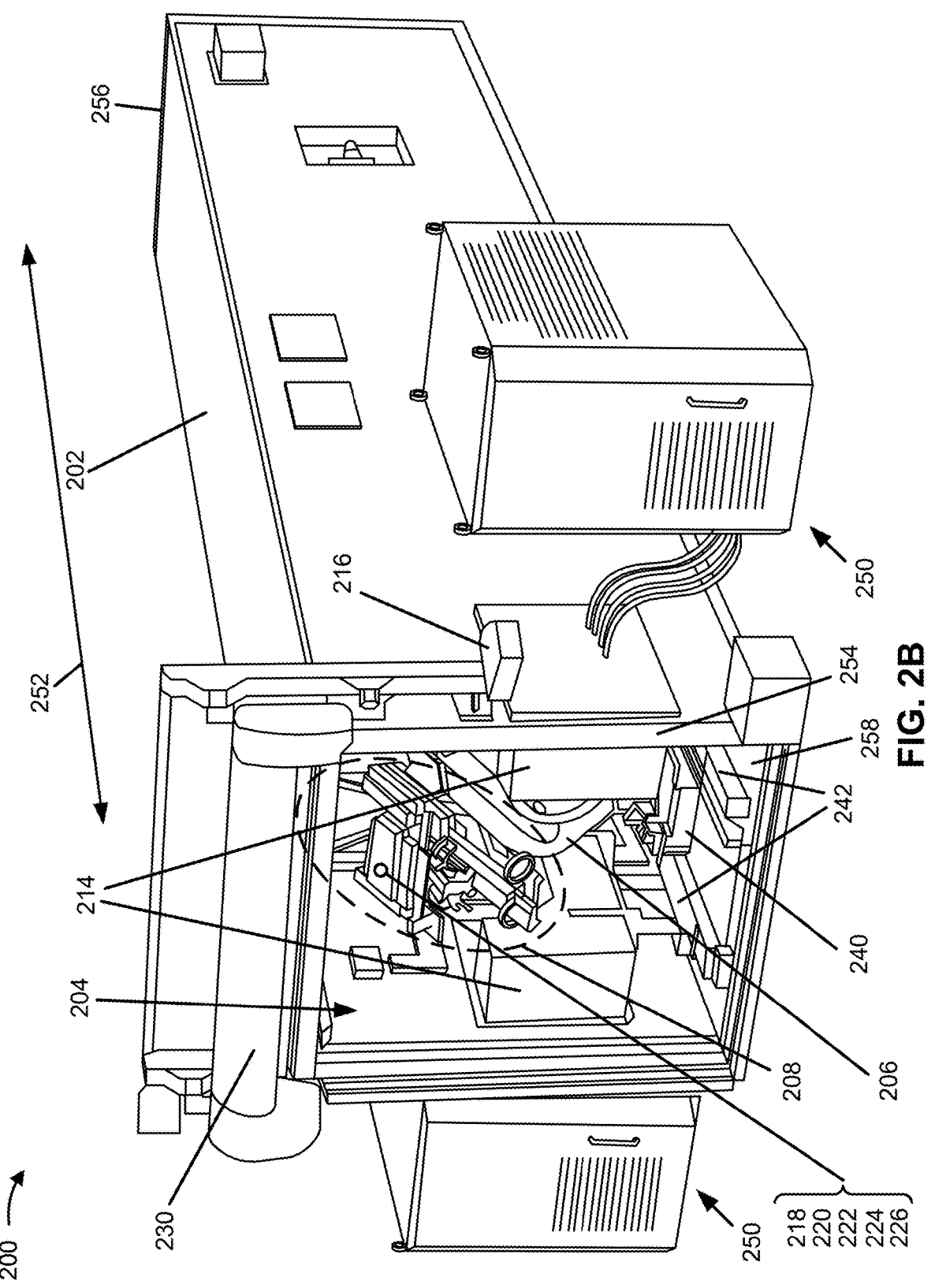

FIGS. 2A-2B are diagrams of an example energy transfer system 200 described herein. The energy transfer system 200 is configured to enable an energy transfer to and/or from the work machine 100 (e.g., to and/or from the energy storage system 102 of the work machine 100). In some implementations, the energy transfer system 200 is configured to autonomously enable the energy transfer (e.g., as further described herein), such as without any interaction with a human technician. However, other implementations include a human technician interacting with the energy transfer system 200 and, thus, the term "energy transfer system" includes any energy transfer system that is at least semi-autonomous (e.g., includes at least one autonomously controlled or operated system or component). FIG. 2A shows a side (cut-away) view of the energy transfer system 200, and FIG. 2B shows a front-angled view of the energy transfer system 200.

As shown in FIGS. 2A-2B, the energy transfer system 200 may include a housing 202 that includes a portal 204 at an end of the housing; a robotic system 206 that includes an end effector 208; a slide system 210; a cable management system 212; an energy transfer outlet system 214; a first camera system 216; a second camera system 218; a door opening system 220; a connector retention system 222; a connector protection system 224; a door closing system 226; and/or one or more controllers 228.

The housing 202 includes a metal, or other hard and/or weather resistant material, and may have a rectangular prism shape and/or other shapes. The housing 202 may include the portal 204 at an end of the housing 202 (e.g., instead of one of the short sides of the housing 202). The energy transfer system 200 may include a housing door 230 that is configured to cover the portal 204 when closed, and to uncover the portal 204 when open. For example, the housing door 230 may be a retractable door. The housing door 230, when closed, may protect an interior of the housing 202, such by preventing dirt, rocks, construction debris, waste matter, moisture, or other material (e.g., present at a work site at which the work machine 100 is operating) from accessing interior of the housing 202.

As shown in FIG. 2A, the interior of the housing 202 may be divided into a first interior portion 232 of the housing 202 and a second interior portion 234 of the housing 202 (e.g., that is separated by a wall, a door, or another separator). The first interior portion 232 of the housing 202 may include the one or more controllers 228 and/or one or more other electrical components, one or more pneumatic components, and/or one or more other communication components, among other examples, that enable operation of the systems and components included in the second interior portion 234 of the housing 202.

The second interior portion 234 of the housing 202 may include the slide system 210, the cable management system 212, and the energy transfer outlet system 214. The second interior portion 234 may also include additional systems and/or components for enabling operation of the robotic system 206 and/or an energy transfer operation, such as a pressure washer system 236 and one or more energy transfer cables 238 (e.g., that are configured to transmit energy to and/or from one or more plugs of the end effector 208). As shown in FIG. 2A, the second interior portion 234 may be associated with the end of the housing 202 that includes the portal 204. The slide system 210 is configured to move the robotic system 206, via the portal 204 of the housing 202, between an interior of the housing 202 (e.g., the second interior portion 234 of the housing 202) and an external environment (e.g., that surrounds the housing 202, such as at a work site). The slide system 210 may include a mounting base 240 for connecting to the robotic system 206 (e.g., for holding the robotic system 206 as the robotic system is moved by the slide system 210) and a slider body 242 for moving the robotic system 206. The robotic system 206 includes an industrial robot. The robotic system 206 may be a baseline industrial robot that is programmable to perform various tasks, such as an energy transfer operation as described herein. For example, the robotic system 206 may have a baseline design and/or configuration (e.g., a non-extended reach design or configuration).

The slide system 210 may include a mounting base 240 for connecting to the robotic system 206 (e.g., for holding the robotic system 206 as the robotic system is moved by the slide system 210) and a slider body 242 for mounting to a floor 258 of the housing 202. The robotic system 206 includes the end effector 208 and a base 260 (shown in FIG. 3). The base 260 is connected or mounted to the mounting base 240. For example, when the housing door 230 is open, the mounting base 240 may be configured to slide the robotic system 206 from the second interior portion 234 of the housing 202 to the external environment (e.g., to allow the robotic system 206 to have uninhibited movement to enable an energy transfer operation) and to slide the robotic system 206 from the external environment to the second interior portion 234 (e.g., to allow the robotic system 206, when not enabling an energy transfer operation, to be protected from environmental conditions associated with the external environment). The mounting base 240 may also provide management of cables or other components associated with operation of the robotic system 206 (e.g., that supply power, pressurized air, pressurized water, among other examples, to the robotic system 206). For example, the mounting base 240 may include one or more structural components to prevent the cables or other components from being damaged when the slide apparatus moves the robotic system 206.

For example, the slide system 210 enables the robotic system 206 to be moved or to slide along a length 252 of the housing 202 (e.g., where the length 252 extends from a first end 254 (e.g., a front side of the housing 202) of the housing 202 (e.g., that includes the portal 204) to a second end 256 of the housing 202). The slide system 210 enables the robotic system 206 to move along a plane that is perpendicular to the front side of the housing 202 (e.g., a plane perpendicular to the first end 254). The length 252 is shown in FIG. 2B.

As shown in FIGS. 2A-2B, the first camera system 216 may be mounted on an exterior (e.g., an exterior side) of the housing 202. The first camera system 216 may include one or more cameras or other image capturing devices. The robotic system includes the end effector 208, which may include (e.g., mounted to the end effector 208) the second camera system 218, the door opening system 220, the connector retention system 222, the connector protection system 224, and/or the door closing system 226. The second camera system 218 is configured to obtain second image data associated with the access mechanism of the receptacle access point 104 and/or of one or more receptacles of the work machine 100. The door opening system 220 is configured to open an access door of the receptacle access point 104 (e.g., based on the location of an access mechanism of the receptacle access point 104 identified by the one or more controllers 228). The door opening system 220 may include a manipulation system for manipulating the access mechanism of the receptacle access point 104 to allow the access door to open.

The energy transfer outlet system 214 is a dispenser system for one or more energy transfer cables 238 coupled to the end effector 208. The energy transfer outlet system 214 is mounted or configured in the interior of the housing 202. The energy transfer outlet system 214 is configured for enabling connection between the one or more energy transfer cables 238 and an external energy transfer dispenser system 250 (e.g., that is not included in the energy transfer system 200). The energy transfer dispenser system 250 may be, for example, configured as a high-capacity external transfer dispenser system that transmits and distributes electrical power at a scale of millions of watts (megawatts) (e.g., the energy transfer dispenser system 250 may include one or more megawatt dispensers). In other examples, the energy transfer dispenser system 250 may be another type of energy transfer dispenser system, such as a hydrogen fuel dispenser, and/or a biofuel dispenser, among other examples. Accordingly, the energy transfer dispenser system 250 may provide energy to the one or more energy transfer cables 238, and thus to plugs of the end effector 208 via the energy transfer outlet system 214.

As indicated above, FIGS. 2A-2B are provided as an example. Other examples may differ from what is described in connection with FIGS. 2A-2B.

Figure 3:
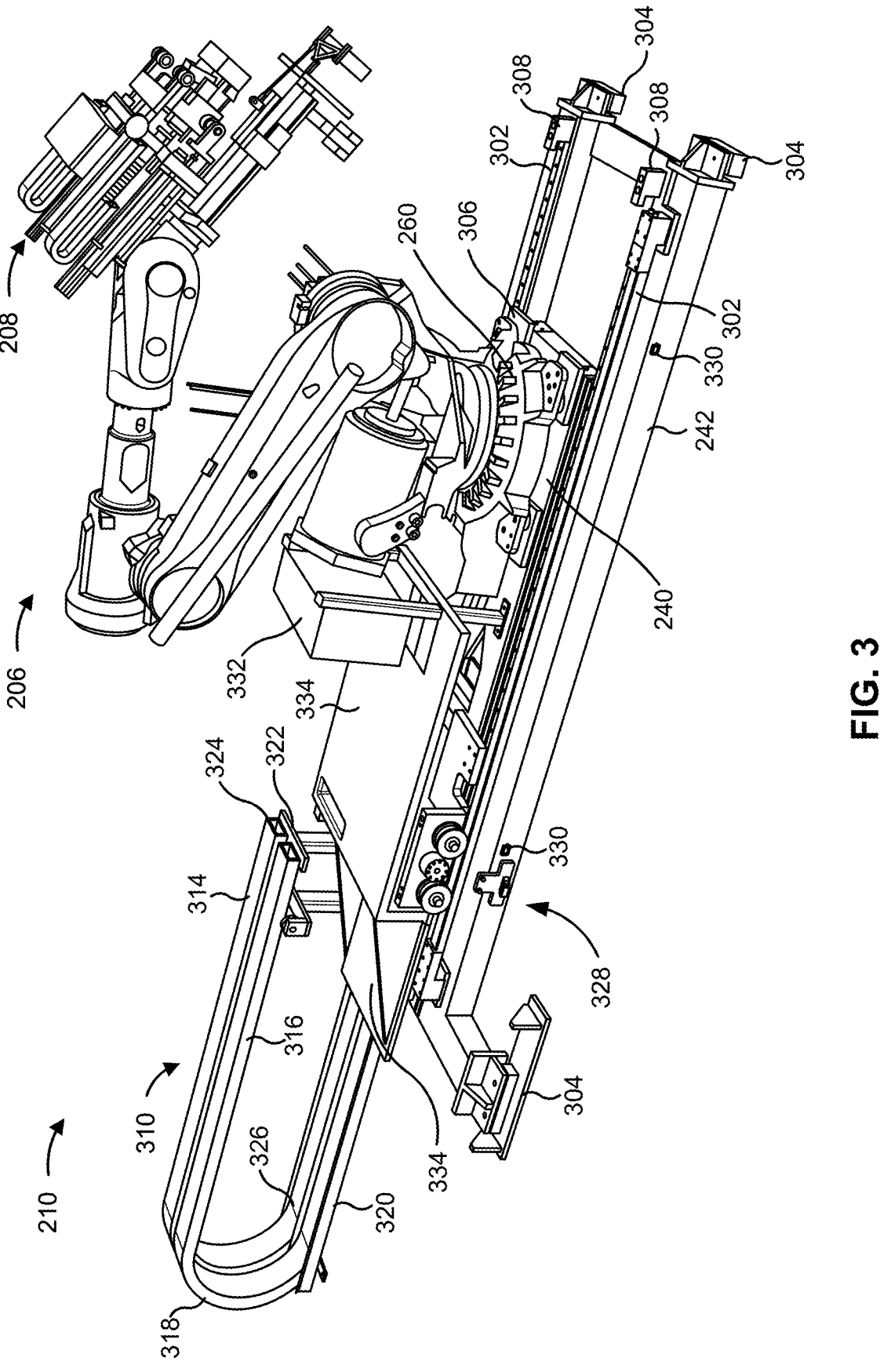
FIG. 3 is a diagram of an example slide system of the energy transfer system described herein.

FIG. 3 is a diagram of an example slide system 210 of the energy transfer system 200 described herein.

The slide system 210 includes the mounting base 240 movably connected to the slider body 242. For example, the slider body 242 includes one or more rails 302 (e.g., two rails 302). The one or more rails 302 are configured to extend along the length 252 of the housing 202 when the slide system 210 is mounted within the housing 202 (e.g., as shown in FIGS. 2A-2B). The mounting base 240 is movably (e.g., slidably) connected to the slider body 242 via the rail(s) 302.

The slider body 242 is configured to be fixed to a surface, such as the floor 258 of the housing 202. The slider body 242 includes one or more base structures 304. The slider body 242 is configured to be mounted to the floor 258 via the base structure(s) 304 (e.g., via one or more mechanical connections and/or a welded connection). For example, the slider body 242 is configured to be mounted in the interior of the housing 202 (e.g., in a fixed position, via the base structure(s) 304 being connected to the floor 258).

As shown in FIG. 3, the base 260 of the robotic system 206 is mounted to the mounting base 240. The mounting base 240 is configured to engage with energy transfer robotic systems, such as the robotic system 206. For example, the mounting base 240 includes a mount 306 configured for mounting the energy transfer robotic systems on the mounting base 240. The mount 306 is configured to engage with the base 260, such as via one or more mechanical connections, one or more bolts, and/or other connection means. The mount 306 is configured to move (e.g., slide) along the slider body 242 (e.g., as the mounting base 240 moves).

This enables the robotic system 206 (e.g., the base 260 of the robotic system 206) to be moved between the interior of the housing 202 and the external environment. For example, the slide system 210 is configured to move the robotic system 206 from the interior of the housing 202 to the external environment to initiate an energy transfer operation via the end effector 208 of the robotic system 206. This reduces the complexity of the energy transfer system 200 because the robotic system 206 may include a baseline industrial robot (e.g., rather than a customized extended reach robot) while still enabling the robotic system 206 to be housed within the housing 202 (e.g., to protect the robotic system 206 from harsh environmental conditions when the robotic system 206 is not performing an energy transfer operation). Additionally, this enables the work machine 100 to be positioned (e.g., to park) further away from the housing 202, providing additional flexibility in the location in which the work machine 100 is positioned for the energy transfer operation and/or reducing the likelihood of incidental contact between the work machine 100 and the energy transfer system 200.

The slide system 210 (e.g., the mounting base 240 and/or the slider body 242) may be constructed from material having a rigidity level that satisfies a rigidity threshold. For example, the slide system 210 (e.g., the mounting base 240 and/or the slider body 242) may comprise square hollow section steel or other materials. Using square hollow section steel may provide the slide system 210 with sufficient rigidity to move the robotic system 206 without excessive bowing, sagging, and/or unintended movement. Additionally, the square hollow section steel may be relatively lightweight as compared to other materials having comparable rigidity levels.

Ensuring that the slide system 210 has sufficient rigidity may improve the performance of the energy transfer operation. For example, the one or more controllers 228 of the energy transfer system 200 may determine guidance or navigation instructions for the robotic system 206 using image data captured via the first camera system 216 and/or the second camera system 218. By the slide system 210 having the sufficient rigidity level, an actual position of the robotic system 206 (e.g., when slid out of the housing 202 via the slide system 210) may be closer to an expected position, thereby improving the performance of the robotic system 206 using the guidance or navigation instructions (e.g., because if the slide system 210 has insufficient rigidity, then the slide system 210 (e.g., the mounting base 240) may sag or bend as the mounting base 240 is extended, resulting in the robotic system 206 being in a lower position than expected when the one or more controllers 228 determine the guidance or navigation instructions). Additionally, by the slide system 210 having the sufficient rigidity level, the end effector 208 and/or the second camera system 218 may be enabled to have a reliable and/or sturdy base as the robotic system 206 is moved, thereby improving the reliability and/or accuracy of operations performed via the end effector 208 and/or the second camera system 218.

The slider body 242 includes one or more stopping blocks 308. The stopping block(s) 308 are configured to stop or block the movement of the mounting base 240 as the mounting base 240 moves along the rail(s) 302. For example, the stopping block(s) 308 are configured on respective rails 302. The stopping block(s) 308 are configured on the respective rails 302 at an end that is configured to be closer to the portal 204 of the housing 202. The stopping block(s) 308 reduce the likelihood of the mounting base 240 sliding off the end of the rail(s) 302, thereby reducing the likelihood of damage to the robotic system 206 that could otherwise occur if the mounting base 240 were to slide off the end of the rail(s) 302.

The slide system 210 includes one or more cable routing components 310 configured to route one or more cables of the robotic system 206 to a connection point (e.g., located beneath and/or behind the mounting base 240). The one or more cable routing components 310 include at least one hollow body 314 (e.g., shown as two hollow bodies 314 in FIG. 3). The cables (e.g., vision cables, power cables, communication cables, air lines, pneumatic lines, hydraulic lines, and/or other cables) are routed through the hollow body 314 (e.g., through an interior of the hollow body 314). This protects the cables of the robotic system 206 and ensures that the cables are routed such that the likelihood of the cables catching, contacting, rubbing, and/or otherwise interacting with other components of the energy transfer system 200 (e.g., as the slide system 210 moves the robotic system 206) is reduced. This reduces the likelihood of damage to the cables that could otherwise be caused by the cables catching, contacting, rubbing, and/or otherwise interacting with other components of the energy transfer system 200.

In some examples, the cable routing components 310 have a curved configuration, as shown in FIG. 3. The cable routing components 310 have a straight portion 316 and a curved portion 318. For example, the cable routing components 310 are configured to route the cables in a curved path from above the mounting base 240 to below the mounting base 240 (e.g., to the connection point(s) for the cables). In some examples, the cable routing components 310 are configured to route the cables to respective guide rails 320. The guide rails 320 extend along the length 252 of the housing 202 (e.g., parallel to the rails 302). The cable routing components 310 are configured to move (e.g., slide) along the length of the guide rails 320 as the mounting base 240 moves.

The one or more cable routing components 310 are coupled to the mounting base 240. For example, the straight portions 316 of the cable routing components 310 are coupled, connected, and/or mounted to the mounting base 240 (e.g., at a connection point 322 on the mounting base 240). The one or more cable routing components 310 are movably coupled to the slider body 242. For example, the slider body 242 includes, or is coupled to, the guide rails 320 (e.g., in a fixed manner). The one or more cable routing components 310 (e.g., the curved portions 318) are configured to slide or move along the guide rails 320.

The one or more cable routing components include a first end 324 and a second end 326. The first end 324 is configured above the mounting base 240 and the second end 326 is configured below the mounting base 240. The one or more cable routing components 310 are configured to route cable(s) between the first end 324 and the second end 326. The first end 324 may be in a fixed position at the connection point 322. The second end 326 may be configured to move or slide along a guide rail 320 as the mounting base 240 moves.

The slide system 210 includes a drive system 328. The drive system 328 is configured to drive or move the mounting base 240 along the slider body 242 (e.g., along the rail(s) 302). For example, the mounting base 240 is movable between the interior of the housing 202 and the external environment via the drive system 328. The drive system includes one or more sensors 330 configured to provide information to facilitate the movement and/or control of the position of the mounting base 240. The drive system 328 may include a cover or housing (not shown herein for improved depiction of the components of the drive system 328). The drive system 328 is described in more detail in connection with FIG. 6.

The slide system 210 includes a control box 332. The control box 332 may house or contain one or more control components for the robotic system 206, such as one or more controllers, processors, computing components, switches, compressors (e.g., for a pneumatic system of the robotic system 206), one or more pneumatic system control devices (e.g., pneumatic valves and/or control components), and/or other components. As shown in FIG. 3, the control box 332 is configured behind the mount 306 (e.g., behind the robotic system 206 mounted on the mounting base 240). The mounting base 240 includes one or more platforms 334 configured behind the control box 332. The platform(s) 334 are relatively flat surfaces. The platform(s) 334 enable an operator or technician to access the control box 332 and/or the robotic system 206 (e.g., for maintenance, inspection, repair, and/or replacement of one or more components). For example, the platform(s) 334 provide a stable surface for the operator or technician to stand on when performing an operation (e.g., maintenance, inspection, repair, and/or replacement) in association with one or more components of the energy transfer system 200.

As indicated above, FIG. 3 is provided as an example. Other examples may differ from what is described in connection with FIG. 3.

Figure 4:
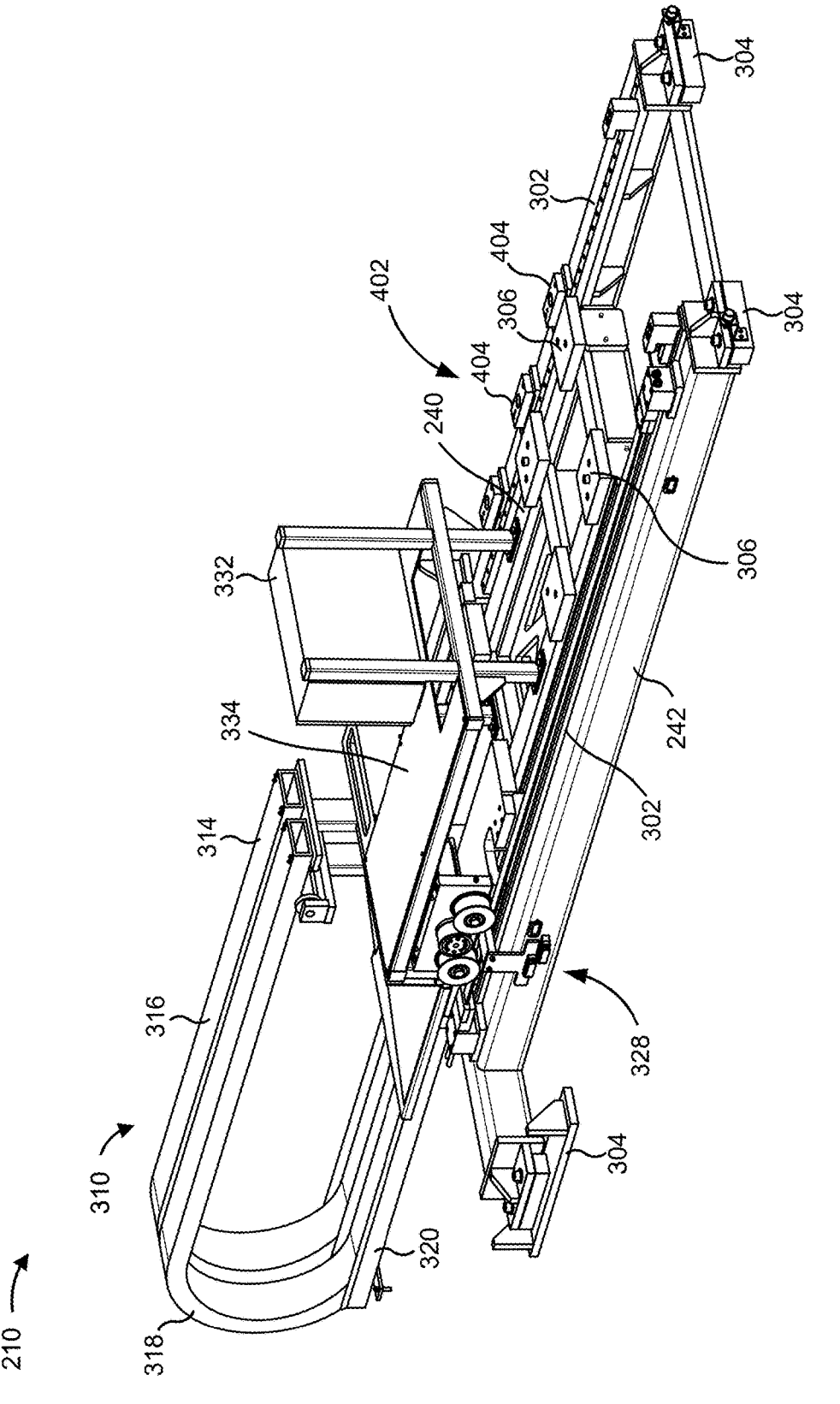
FIG. 4 is a diagram of an example slide system of the energy transfer system described herein.

FIG. 4 is a diagram of an example slide system 210 of the energy transfer system 200 described herein. FIG. 4 depicts the slide system 210 in a first position. The first position is associated with the causing the robotic system 206 to be positioned within the interior of the housing 202 (e.g., such that the housing door 230 can close without contacting the robotic system 206, and to seal or block the portal 204 of the housing 202). The first position may be a retracted position or a storage position. For example, the first position is the position in which the robotic system 206 is stored or contained within the housing 202.

As shown in FIG. 4, the slide system 210 includes a locking mechanism 402 configured to lock a position of the mounting base 240 at one or more positions along the slider body 242. For example, the locking mechanism 402 includes one or more locking apertures 404 positioned at respective locations on the slider body 242 (e.g., on a rail 302). For example, the locking mechanism 402 is configured to lock the position of the slide system 210 (e.g., of the mounting base 240) in the first position shown in FIG. 4. The locking mechanism 402 is depicted and described in more detail in connection with FIGS. 7 and 8.

As indicated above, FIG. 4 are provided as an example. Other examples may differ from what is described in connection with FIG. 4.

Figure 5:
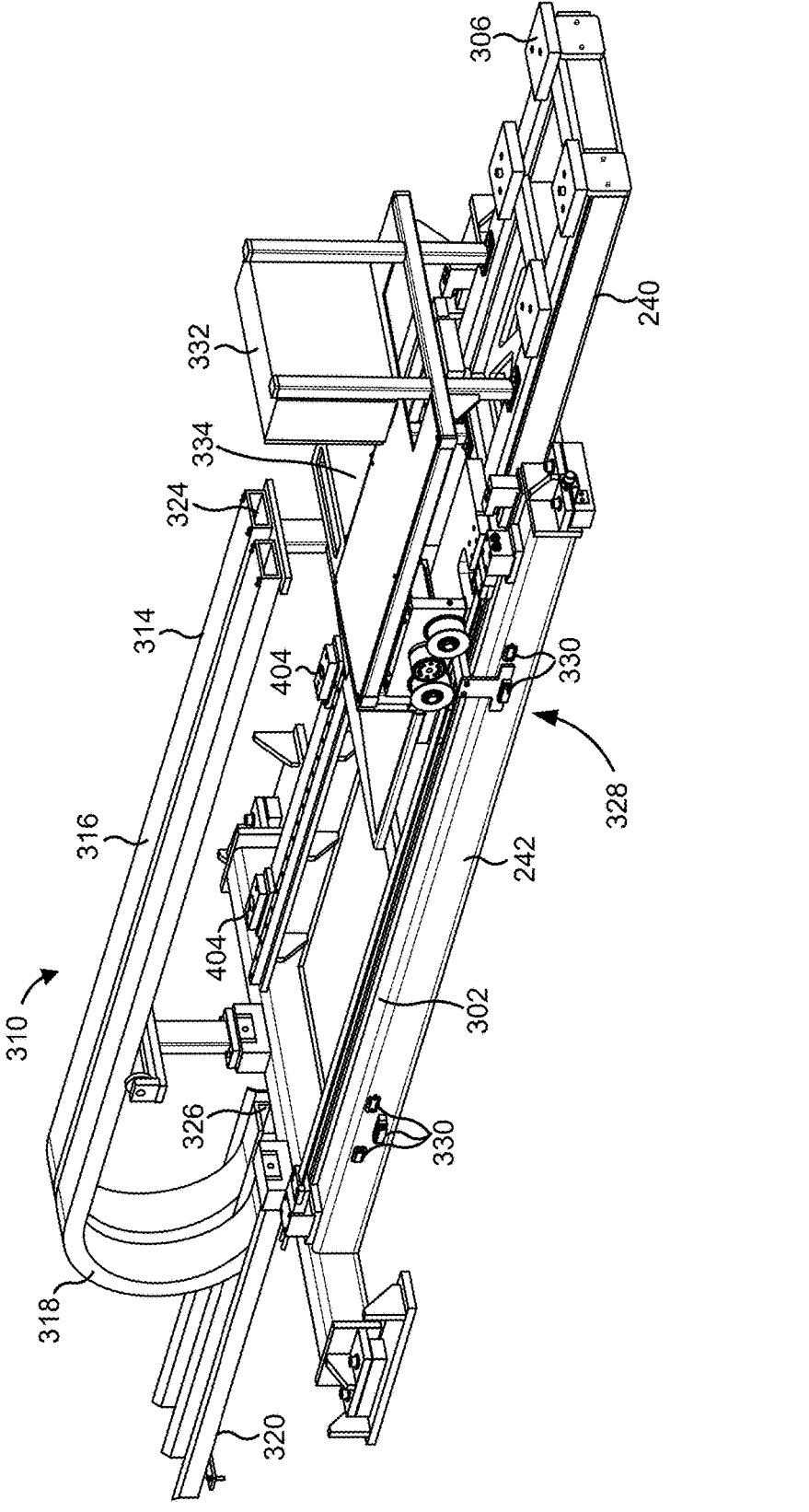
FIG. 5 is a diagram of an example slide system of the energy transfer system described herein.

FIG. 5 is a diagram of an example slide system 210 of the energy transfer system 200 described herein. FIG. 5 depicts the slide system 210 in a second position. The second position is associated with causing the robotic system 206 to be positioned in the exterior environment outside of the housing 202 (e.g., such that the mounting base 240 and/or the robotic system 206 extend out of the portal 204 of the housing 202). The second position may be an extended position or an energy transfer position. For example, the second position is the position in which the robotic system 206 engages in energy transfer for the work machine 100. Although two positions are described herein, the slide system 210 can have more than two positions, such as three positions, four positions, five positions, or another number of positions. The multiple positions may include one or more non-operational positions (e.g., a "parked" position or a position in which the robotic system 206 is not configured to operate, such as the first position shown in FIG. 4) and one or more operational positions (e.g., a "working" position, an extended position, and/or a position in which the robotic system 206 is not configured to operate, such as the second position shown in FIG. 5).

For example, the drive system 328 is configured to cause the mounting base 240 to move along the slider body 242 (e.g., along the one or more rails 302) between the first position (shown in FIG. 4) and the second position (e.g., shown in FIG. 5). This enables the robotic system 206 to move between the interior of the housing 202 and the external environment, facilitating the performance of energy transfer operations with the work machine 100. The locking mechanism 402 is configured to lock the position of the slide system 210 (e.g., of the mounting base 240) in the second position shown in FIG. 4 (e.g., via a locking aperture 404). This improves the stability of the mounting base 240 while the slide system 210 in the second position (e.g., reducing the likelihood of the mounting base 240 unintentionally moving along the slider body 242). This improved stability of the mounting base 240 improves the performance, reliability, and/or precision of operations performed by the robotic system 206 for the energy transfer operation.

As shown in FIG. 5, as the mounting base 240 moves along the slider body 242, the cable routing components 310 move with the mounting base 240. For example, the second end 326 of the cable routing components 310 may move (e.g., slide) along the guide rails 320. The movement of the cable routing components 310 improves cable management for the energy transfer system 200 by reducing the likelihood that the cables sag, dip, bend, kink, and/or otherwise contact other components of the energy transfer system 200 as the slide system 210 and/or the robotic system 206 are moved between the interior of the housing 202 and the exterior environment.

As indicated above, FIG. 5 are provided as an example. Other examples may differ from what is described in connection with FIG. 5.

Figure 6:
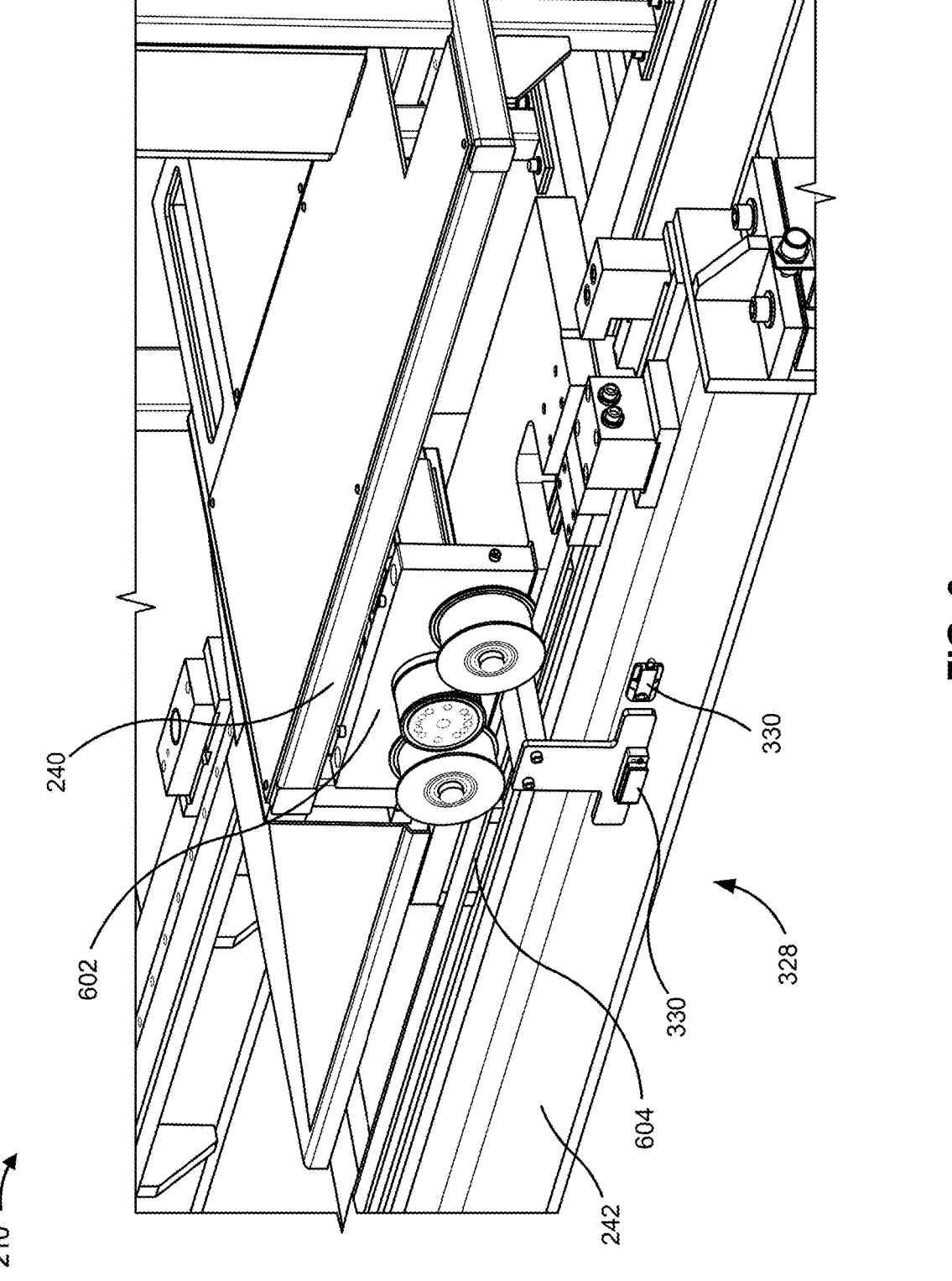
FIG. 6 is a diagram of an example drive system of the slide system described herein.

FIG. 6 is a diagram of an example drive system 328 of the slide system 210 described herein. The drive system 328 is configured for moving the mounting base 240 along the slider body 242, such as between the first position (shown in FIG. 4) and the second position (e.g., shown in FIG. 5), and/or other positions not shown in the Figures.

In some examples, the drive system 328 includes a positioning motor 602. The positioning motor 602 is configured to drive or move the position of the mounting base 240. The positioning motor 602 is coupled to the mounting base 240. In some examples, the positioning motor 602 is an electric motor, a servo motor, or another type of motor. Using a servo motor as the positioning motor may enable high precision control of the position of the mounting base 240. The positioning motor 602 may use a closed-loop control system that uses sensor information obtained via the sensor(s) 330 to adjust the operation of the positioning motor 602 to reach and/or maintain a desired position of the mounting base 240 (e.g., an encoder or other component of the positioning motor 602 may use the sensor information to adjust the operation of the positioning motor 602). For example, the encoder of the positioning motor 602 can determine and/or confirm a position of the mounting base 240 relative to the slider body 242. The sensor(s) 330 can provide sensor information to ensure that the mounting base 240 does not become disengaged from the slider body 242 (e.g., to ensure that the mounting base 240 does not "slide off" the slider body 242). In some examples, the sensor(s) 330 include one or more sensors configured to obtain sensor information indicative of positional information for the positioning motor 602 and one or more sensors configured to obtain sensor information indicative of positional information for the slide system 210 as a whole (e.g., for a position of the mounting base 240). The sensor(s) 330 may include an encoder, a resolver (e.g., a rotary transformer, a potentiometer, a Hall effect sensor, a linear variable differential transformer, and/or a load cell, among other examples. The sensor(s) 330 are configured to obtain location information for a location of the mounting base 240 along the slider body 242.

The drive system 328 includes a belt drive 604. The belt drive 604 includes a belt, one or more pulleys, and/or one or more shafts, among other examples. The belt drive 604 is configured to transfer mechanical energy from the positioning motor 602 to the mounting base 240 to cause the mounting base 240 to move along the slider body 242. The belt drive 604 is driven by the positioning motor 602. The mounting base 240 is movable between the interior of the housing 202 and the external environment via the belt drive 604 (e.g., via the mechanical energy transferred by the belt drive). By using the belt drive 604, a movement of the mounting base 240 may be smoother as compared to other types of drives, such as a chain drive or a gear drive. The smooth movement enabled by the belt drive 604 may improve the reliability, accuracy, and/or precision of one or more operations performed via the robotic system 206, such as a movement of the end effector 208 and/or image data captured via the second camera system 218.

As indicated above, FIG. 6 are provided as an example. Other examples may differ from what is described in connection with FIG. 6.

Figure 7:
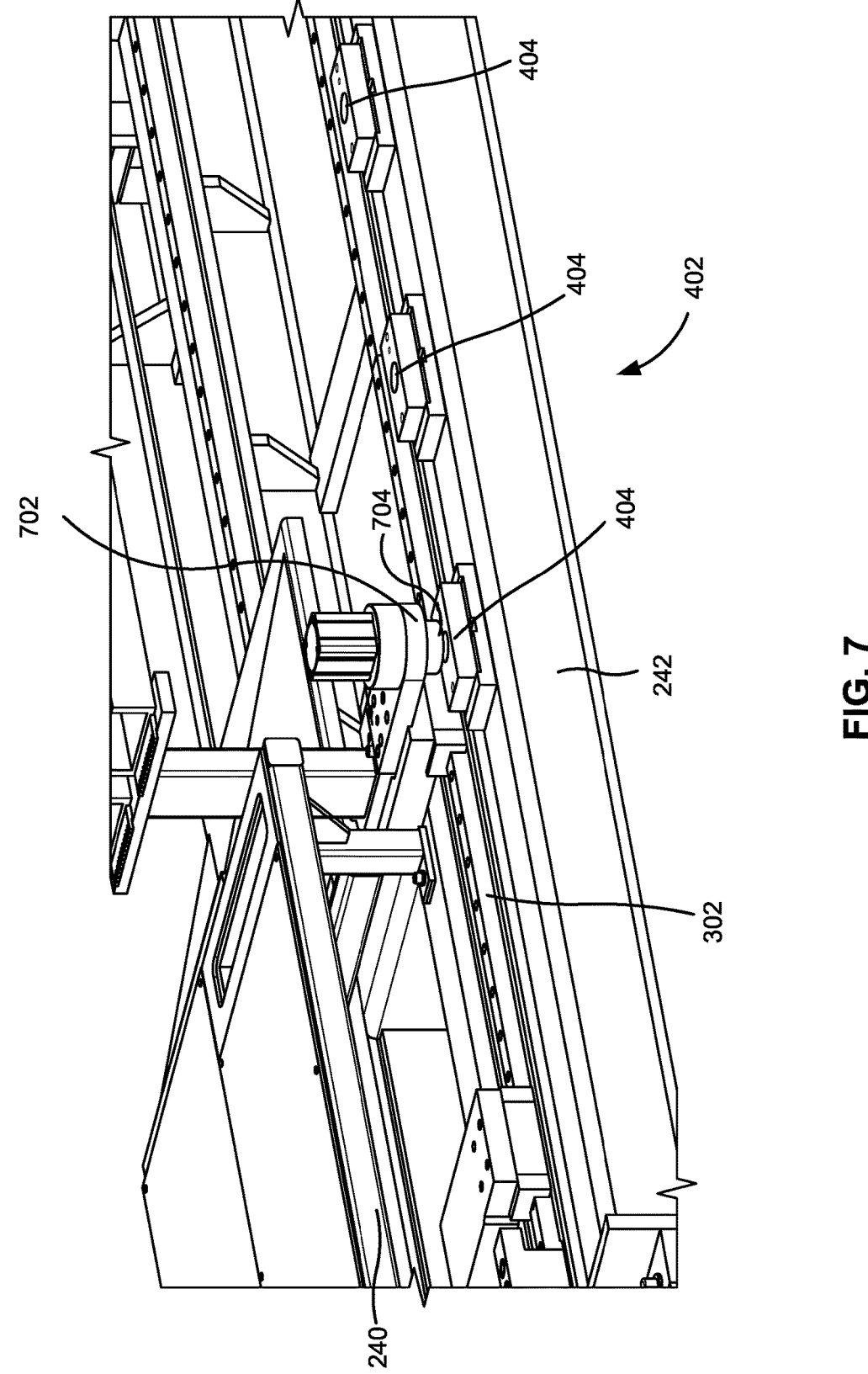
FIG. 7 is a diagram of an example locking mechanism of the slide system described herein.

FIG. 7 is a diagram of an example locking mechanism 402 of the slide system 210 described herein. The locking mechanism 402 is configured to lock the position of the mounting base 240 at one or more positions along the slider body 242. The locking mechanism 402 may be configured at least in part on a rail 302. In some examples, the drive system 328 is configured on a first rail 302 and the locking mechanism 402 is configured at least in part on a second rail 302.

For example, the slider body 242 (e.g., the second rail 302) includes one or more locking apertures 404. The mounting base 240 includes a locking apparatus 702 configured to engage with the one or more locking apertures 404 to lock the position of the mounting base 240. The locking apparatus 702 is connected and/or mounted to a side of the mounting base 240 (e.g., proximate to a rail 302).

For example, the locking apparatus 702 includes a locking rod 704 (e.g., shown in more detail in FIG. 8) that is configured to move into a locking aperture 404 (e.g., to lock the position of the mounting base 240) and move out of the locking aperture 404 (e.g., to enable the mounting base 240 to move along the slider body 242 (e.g., driven by the drive system 328)). Providing multiple locking positions (e.g., corresponding to respective locking apertures 404) for the mounting base 240 provides flexibility for the operation of the energy transfer system 200 by providing multiple locations of the robotic system 206 in which the position of the robotic system 206 can be locked in a steady and stable position (e.g., via the locking mechanism 402 locking the position of the mounting base 240). The steady and stable position (e.g., the locked position) improves the performance of the robotic system 206 by reducing the likelihood of movement of the mounting base 240 (and because of the connection between the base 260 and the mounting base 240) during operation of the robotic system 206 (e.g., providing a steady and reliable base position for the robotic system 206 during an energy transfer operation).

As indicated above, FIG. 7 are provided as an example. Other examples may differ from what is described in connection with FIG. 7.

Figure 8:
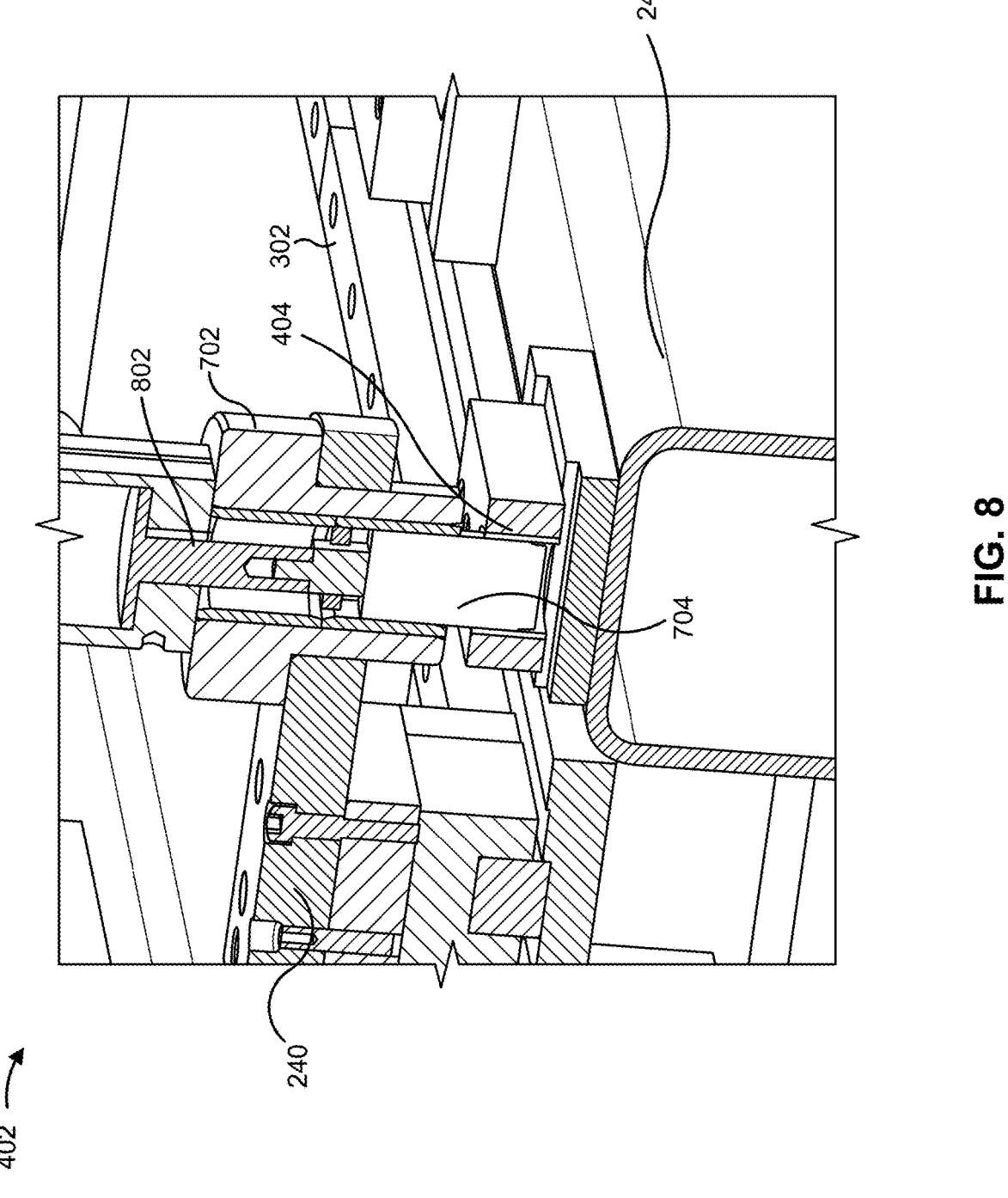
FIG. 8 is a diagram of an example cross-section view of the locking mechanism described herein.

FIG. 8 is a diagram of an example cross-section view of the locking mechanism 402 described herein. In the example shown in FIG. 8, the locking mechanism 402 is locking the position of the mounting base 240 (e.g., relative to the slider body 242) via an engagement between the locking rod 704 and a locking aperture 404.

For example, as shown in FIG. 8, the locking rod 704 is inserted into the locking aperture 404. This reduces the likelihood of movement of the mounting base 240. The locking apparatus 702 includes one or more mechanisms 802 for driving or actuating a position of the locking rod 704. For example, one or more mechanisms 802 include a pneumatic mechanism, a hydraulic mechanism, or another type of mechanism to actuate the position of the locking rod 704 (e.g., between being inserted into the locking aperture 404 as shown in FIG. 8 and removed from the locking aperture 404 to enable the mounting base 240 to move relative to the slider body 242).

As shown in FIG. 8, and as described elsewhere herein, the slider body 242 (and/or the mounting base 240) may be made of hollow body material, such as square hollow body steel, among other examples.

As indicated above, FIG. 8 are provided as an example. Other examples may differ from what is described in connection with FIG. 8.

INDUSTRIAL APPLICABILITY

In some examples, a mechanical system may be used to enable the engagement of the one or more plugs and/or receptacles for the energy transfer operation. However, because of the size of a machine, a complex mechanical system may be used to enable the mechanical system to reach the energy transfer interface on the machine, such as a customized robotic system with an extended reach arm. This increases the complexity and cost of the mechanical system used to enable energy transfer for the machine. Additionally, or alternatively, the machine may need to be positioned close to the mechanical system to enable the mechanical system to reach and/or engage with the energy transfer interface of the machine. Because the machine may be large and/or difficult to precisely maneuver, positioning (e.g., parking) the machine close to the mechanical system for the energy transfer operation increases the risk of the machine inadvertently contacting or hitting the mechanical system, such as via operator error when approaching the mechanical system (e.g., because the machine may approach (e.g., drive up to) the mechanical system to perform an energy transfer operation, where the mechanical system is in a fixed location). This increases the risk of damage to the mechanical system used for the energy transfer operation. Further, the machine may operate in environments associated with harsh conditions (e.g., extreme temperatures, high wind speeds, a large amount of debris, and/or other harsh conditions), such as a mine site and/or other work sites. As a result, the mechanical system may operate in the harsh conditions, increasing the risk of damage to one or more components of the mechanical system (e.g., due to the components operating in and/or being exposed to the harsh conditions).

The slide system described herein enables a reach of a robotic system to be increased within a confined area of a housing (e.g., that protects the robotic system from the harsh conditions) and that does not increase the complexity of the robotic system. For example, the slide system includes a slider body mounted to a floor of the housing. The slide system includes a mounting base movably connected to the slider body, where a base of the robotic system is mounted to the mounting base. Additionally, the slide system includes one or more cable routing components configured to route one or more cables of the robotic system. In some examples, the slide system includes a locking mechanism configured to lock a position of the mounting base at one or more positions along the slider body.

The slide system enables the robotic system (e.g., the base of the robotic system) to be moved between the interior of the housing and the external environment. This reduces the complexity of the energy transfer system because the robotic system may include a baseline industrial robot (e.g., rather than a customized extended reach robot) while still enabling the robotic system to be housed within the housing (e.g., to protect the robotic system from harsh environmental conditions when the robotic system is not performing an energy transfer operation). Additionally, this enables the machine to be positioned (e.g., to park) further away from the housing, providing additional flexibility in the location in which the machine is positioned for the energy transfer operation and/or reducing the likelihood of incidental contact between the machine and the energy transfer system.

The slide system is configured to provide stable and rigid support for the robotic system as the robotic system is moved. Ensuring that the slide system has sufficient rigidity improves the performance of the energy transfer operation. By the slide system having the sufficient rigidity level, an actual position of the robotic system (e.g., when slid out of the housing via the slide system) may be closer to an expected position, thereby improving the performance of the robotic system using the guidance or navigation instructions (e.g., because if the slide system has insufficient rigidity, then the slide system may sag or bend as the mounting base is extended, resulting in the robotic system being in a lower position than was expected when one or more controllers determined the guidance or navigation instructions). Additionally, by the slide system having the sufficient rigidity level, the end effector and/or a camera system mounted on the end effector may be enabled to have a reliable and/or sturdy base as the robotic system is moved, thereby improving the reliability and/or accuracy of operations performed via the end effector and/or the camera system.

By providing multiple locking positions (e.g., corresponding to respective locking apertures) for the mounting base via the locking mechanism, the slide system provides flexibility for the operation of the energy transfer system by providing multiple locations of the robotic system in which the position of the robotic system can be locked in a steady and stable position (e.g., via the locking mechanism locking the position of the mounting base). The steady and stable position (e.g., the locked position) improves the performance of the robotic system by reducing the likelihood of movement of the mounting base (and because of the connection between the base and the mounting base, the robotic system) during operation of the robotic system (e.g., providing a steady and reliable base position for the robotic system during an energy transfer operation).

What is claimed is:

1. An energy transfer system, comprising:
   a housing;
   a robotic system that includes one or more components for enabling energy transfer; and
   a slide system configured to move the robotic system between an interior of the housing and an external environment, wherein the slide system comprises:
      a slider body mounted to a floor of the housing; and
      a mounting base movably connected to the slider body to move past a first end of the slider body toward the external environment, a base of the robotic system being mounted to the mounting base.

2. The energy transfer system of claim 1, wherein the slide system further comprises:
   one or more cable routing components configured to route one or more cables of the robotic system to a connection point.

3. The energy transfer system of claim 2, wherein the one or more cable routing components include a hollow body, and wherein the one or more cables are routed through the hollow body.

4. The energy transfer system of claim 2, wherein the one or more cable routing components are coupled to the mounting base, and
   wherein the one or more cable routing components are movably coupled to the slider body.

5. The energy transfer system of claim 1, wherein the slide system further comprises:
   a belt drive driven by a positioning motor, wherein the belt drive is configured to move the mounting base along the slider body.

6. The energy transfer system of claim 5, wherein the mounting base is movable between the interior of the housing and the external environment via the belt drive.

7. The energy transfer system of claim 1, wherein the slide system further comprises:
   a locking mechanism configured to lock a position of the mounting base at one or more positions along the slider body.

8. The energy transfer system of claim 7, wherein the locking mechanism comprises:
   one or more locking apertures on the slider body corresponding to the one or more positions; and a locking apparatus on the mounting base configured to engage with the one or more locking apertures to lock the position of the mounting base.

9. The energy transfer system of claim 1, wherein the mounting base comprises square hollow section steel.

10. A slide system for moving an energy transfer robotic system, comprising:

a slider body;

a mounting base configured to engage with the energy transfer robotic system, wherein the mounting base is movably configured on the slider body; and one or more cable routing components, movably coupled to the slider body to translate along the slider body, configured to route one or more cables of the energy transfer robotic system.

11. The slide system of claim 10, wherein the one or more cable routing components are coupled to the mounting base, and wherein the one or more cable routing components are movably coupled to the slider body.

12. The slide system of claim 10, wherein the one or more cable routing components include a first end and a second end, wherein the first end is configured above the mounting base, and wherein the second end is configured below the mounting base.

13. The slide system of claim 10, wherein the mounting base comprises:

a mount configured for mounting the energy transfer robotic system on the mounting base; and a control box for housing one or more control components of the energy transfer robotic system, wherein the control box is mounted on the mounting base behind the mount.

14. The slide system of claim 13, wherein the mounting base further comprises:

a platform configured behind the control box.

15. The slide system of claim 10, further comprising:

a drive system for moving the mounting base along the slider body, the drive system including a belt drive and a servo motor.

16. The slide system of claim 15, wherein the drive system further comprises:

one or more sensors configured to obtain location information for a location of the mounting base along the slider body.

17. The slide system of claim 10, further comprising:

a locking mechanism configured to lock a position of the mounting base at one or more positions along the slider body.

18. A system, comprising:

a housing;

a robotic system; and a slide system configured to move the robotic system between an interior of the housing and an external environment, wherein the slide system comprises:

a slider body mounted in the interior of the housing; and a mounting base movably connected to the slider body, a base of the robotic system being mounted to the mounting base, and the mounting base being movable between the interior of the housing and the external environment by moving past a first end of the slider body toward the external environment.

19. The system of claim 18, wherein the slider body includes one or more locking apertures, and wherein the mounting base includes a locking apparatus configured to engage with the one or more locking apertures to lock a position of the mounting base.

20. The system of claim 18, wherein the slide system is configured to move the robotic system from the interior of the housing to the external environment to initiate an energy transfer operation via an end effector of the robotic system.

\* \* \* \* \*